United States Patent [19]

James et al.

[11] Patent Number: 5,394,744

[45] Date of Patent: Mar. 7, 1995

[54] FAULT DETECTION USING AVERAGING FILTER WITH VARIABLE RESPONSE TIME

[75] Inventors: John V. James, Walled Lake; Timothy M. Feldkamp, Ann Arbor, both of Mich.

[73] Assignee: Ford Motor Company, Dearborn, Mich.

[21] Appl. No.: 177,498

[22] Filed: Jan. 5, 1994

[51] Int. Cl.⁶ .......................................... G01M 15/00
[52] U.S. Cl. ................................................. 73/117.3
[58] Field of Search .................... 73/116, 117.3, 117.2

[56] References Cited

U.S. PATENT DOCUMENTS

| | | | |
|---|---|---|---|
| 4,295,363 | 10/1981 | Buck et al. | 73/117.3 |
| 4,527,422 | 7/1985 | Hönig et al. | 73/117.3 |
| 4,866,980 | 9/1989 | Falkmann et al. | 73/117.3 |
| 5,044,195 | 9/1991 | James et al. | 73/117.3 |
| 5,095,742 | 3/1992 | James et al. | 73/116 |
| 5,109,695 | 5/1992 | James et al. | 73/117.3 |
| 5,258,753 | 11/1993 | Jonker et al. | 73/117.3 |
| 5,275,037 | 1/1994 | Nakayama et al. | 73/117.3 |
| 5,297,047 | 3/1994 | Matsuno | 73/117.3 |
| 5,305,635 | 4/1994 | James et al. | 73/116 |
| 5,307,671 | 5/1994 | Akase | 73/117.3 |

OTHER PUBLICATIONS

*The Exponentially Weighted Moving Average*, J. Stuart Hunter, Journal of Quality Technology, vol. 18, No. 4, Oct., 1986, 179 Longview Dr., Princeton, N.J. 08540.
*Control Chart Tests Based On Geometric Moving Averages*, S. W. Roberts, Bell Telephone Laboratories, Technometrics, vol. 1, No. 3, Technometrics, Aug., 1959.
*Exponentially Weighted Moving Average Control Schemes: Properties and Enhancements*, James M. Lucas, Engineering Department, E. I. du Pont de Nemours and Company, Newark, Del. 19714-6090 and Michael S. Saccucci, Dept. of Quantitative Methods, Drexel University, Philadelphia, Pa. 19104, Technometrics, Feb., 1990, vol. 32, No. 1.
*Optimal Properties of Exponentially Weighted Forecasts*, John F. Muth, Carnegie Institute of Technology, Journal of American Statistical Association, 1960, vol. 55.
*Misfire Detection by Evaluating Crankshaft Speed—A Means to Comply with OBDII*, Martin Klenk and Winifried Moser of Robert Bosch GMBH and Werner Mueller and Wolfgang Wimmer of Audi AG, SAE Technical Paper Series 930399, International Congress and Exposition, Detroit, Mich., Mar. 1-5, 1993.

*Primary Examiner*—Richard E. Chilcot, Jr.
*Assistant Examiner*—George M. Dombroske
*Attorney, Agent, or Firm*—Mark Mollon; Roger L. May

[57] ABSTRACT

The time needed to verify proper operation of a fault detection system or to verify the impact of the replacement of a component in the system being monitored is reduced without substantial increase in the possibility of false indication of failure or false indication of proper operation by employing a geometric moving average with a variable time constant reset to a minimum value upon initialization and gradually increasing to a maximum value. Motor vehicle systems and components are monitored and a diagnostic indicator annunciates faults to alert the vehicle operator to malfunctions.

7 Claims, 3 Drawing Sheets

FAULT DETECTION USING AVERAGING FILTER WITH VARIABLE RESPONSE TIME

BACKGROUND OF THE INVENTION

The present invention relates in general to detection of faults in vehicle systems such as an engine, and more specifically to use of an averaging filter to reduce the possibility of false indications of a fault.

It is well known to monitor the operation of a vehicle system and/or component using a sensor to detect a performance parameter of the system or component. The performance parameter is then examined in order to detect a fault in the operation of the monitored system or component. For example, faults in an internal combustion engine resulting in engine misfire can be monitored by sensing engine crankshaft acceleration as described in U.S. Pat. Nos. 5,044,194; 5,044,195; 5,056,360; 5,095,742; 5,109,695; and 5,117,681. In another example, the efficiency of a catalytic converter is inferred by sensing oxygen storage in the exhaust flow based on exhaust gas oxygen (EGO) sensors.

Monitoring of the system or component to detect a fault produces a data stream corresponding to a performance parameter of the system or component that defines the presence of a fault to be detected. The data stream may be directly derived from the sensor data or may include parameter calculations using the sensor data. For example, in misfire detection, crankshaft velocity measurements are used in calculating crankshaft acceleration deviations which are then compared to an expected torque and a data stream identifying the results of the comparisons is generated as described in the above patents. The data stream for a misfire detector consists of only a couple of discrete values such as "0" to represent a proper firing and "1" to represent a misfire for an individual cylinder event. A fault is then determined by examining the misfire rate indicated by the data stream (the percent of misfires to total cylinder events). In the case of other diagnostic systems such as exhaust gas oxygen sensor and catalyst efficiency monitoring, the data stream is multivalued and the magnitude of the data is compared to a threshold which defines the presence of a fault.

The data stream characterizing a system or component inherently includes random error fluctuations that often can be characterized as Gaussian noise. The fluctuations can result in false detection of a fault. Therefore, the data stream is averaged to reduce false detections of faults since averaging reduces the effect of the random error fluctuations.

For purposes of performing an averaging function to produce a low probability of false fault detection while still maintaining a fast response time to the occurrence of a real fault, a geometric moving average (GMA) provides significant improvements over the conventional fixed window average (FWA), as described in co-pending application Ser. No. 08/042,257, filed on Apr. 2, 1993, hereby incorporated by reference. The advantage of the GMA over other averaging techniques is that it better balances the conflicting requirements of quick responsiveness to changes in the data stream being averaged while filtering out signal noise that could otherwise lead to a false fault detection.

An important characteristic of any averaging filter is its time constant. In a vehicle diagnostic system, the time constant of the averaging filter must be selected to be long enough to avoid false detection of a fault over the extending driving cycles of the vehicle (which may include an astronomical amount of data in the data stream such as for misfire detection with about 100 cylinder events each second). Due to the time constant, however, a certain delay is experienced in any change in the diagnostic output in response to a change in the data stream (i.e., from a no fault to a fault condition or vice versa).

In servicing of a vehicle, there may be a deliberate change made to the vehicle system or component being monitored, resulting in a corresponding change in the data stream values. It may be desired to monitor the resulting change in the diagnostic output to determine the effect of the deliberately introduced change on the vehicle system or component or even to test the functionality of the monitoring system itself. However, the delay in obtaining the updated diagnostic output may be undesirably long, especially in instances where the system or component produces a data stream value only once per driving cycle, for example.

SUMMARY OF THE INVENTION

The present invention obtains the advantage of improving the responsiveness of fault detection at a time of initialization of the fault detector system, such as after introducing a change to the system or component being monitored, wherein the initial responsiveness is improved with a negligible increase in the probability of false detection of a fault.

In the vehicle systems and components being monitored, the probability of false detection of a fault is typically very low, for example, often less than one percent. However, due to the very large number of data points in the data stream being monitored and the long lifetime of service of the vehicle fault detection system, even such low probabilities of false detections will eventually create false indications of faults without averaging. Nevertheless, the probability of a false detection of a fault within any one short period of time may be low even without averaging. Therefore, the present invention realizes that a temporary improvement in responsiveness to changes in the data stream can be realized at the expense of a temporary but very small increase in the overall probability of a false detection of a fault.

In one aspect of the invention, a fault detection system for a vehicle includes a performance monitor producing a data stream quantifying a performance parameter of the vehicle. The data stream includes random error fluctuations. A geometric filter filters the data stream to produce average values having reduced random error fluctuations. The geometric filter is characterized by a time constant that is initialized to a minimum value and is incremented with each iteration thereafter to a maximum value. A comparator compares the average values with the predetermined threshold and generates a fault signal when one of the average values exceeds the predetermined threshold. A diagnostic indicator annunciates a fault in response to the fault signal.

DETAILED DESCRIPTION OF PREFERRED EMBODIMENTS

Figure 1:
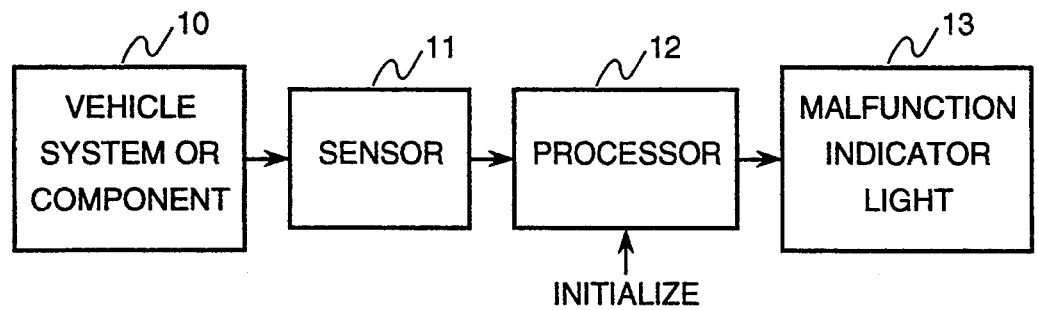
FIG. 1 is a block diagram showing a fault detection system according to the present invention.

Referring to FIG. 1, a vehicle system or component 10 is monitored by a sensor 11. A signal is provided from sensor 11 to a processor 12 which examines the sensor signal to determine the existence of a fault. If a fault is detected, a signal is provided to malfunction indicator light 13 to annunciate the presence of the fault to the operator of the vehicle. Processor 12 is responsive to an initialize signal which may be generated externally by a service technician, for example. Fault conditions within the vehicle systems or components that are typically monitored include catalyst efficiency, engine misfire, evaporative purge, secondary air flow, air/fuel control, oxygen sensor response, and exhaust gas recirculation function and flow. In some cases, the system or component being monitored may itself provide the performance parameter, thereby eliminating the need for an additional sensor 11. Thus, the vehicle system or component 10 may directly provide the performance parameter to processor 12 (such as where the monitored component is itself a sensor).

Figure 2:
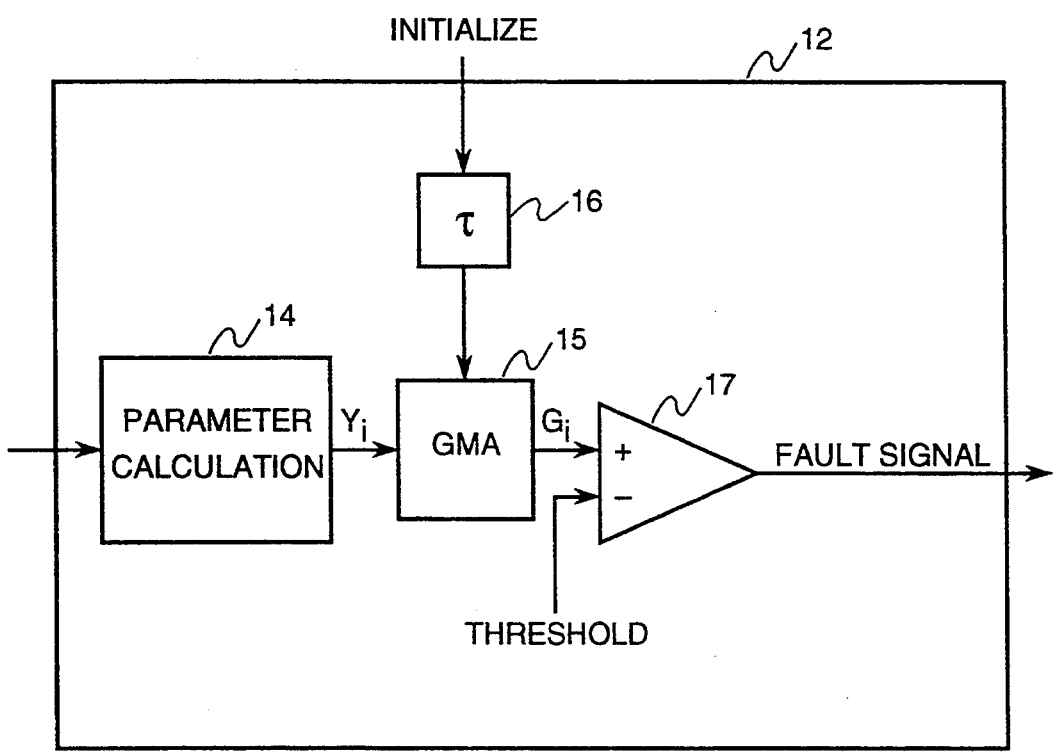
FIG. 2 is a block diagram showing the processor of FIG. 1 in greater detail.

As shown in FIG. 2, the signal from sensor 11 (or directly from system or component 10) is provided to a parameter calculation block 14. For example, acceleration may be calculated in a misfire detector or oxygen storage may be calculated in a catalyst monitor. The final result of parameter calculation 14 is a data stream that quantifies the selected performance parameter of the vehicle, such as classification of engine misfires or catalyst efficiency. In some cases, a sensor signal may not require any special processing to obtain the performance parameter for the data stream. In either case, the data stream is provided to GMA filter 15. A time constant $\tau$ is provided by a time constant block 16 to GMA filter 15 to be utilized in determining the geometric moving average. Block 16 receives the initialization signal. The GMA output is provided to one input of a comparator 17 for comparing the GMA value to a threshold. If the average value exceeds the threshold, a fault signal is output by comparator 17. Processor 12 is typically comprised of a microcomputer, and each element therein can be typically considered to be a software block.

As shown in FIG. 2, the data stream is denoted $Y_i$ and the GMA value is denoted $G_i$, where i is a sample number. Each average value $G_i$ is determined by the current sample $Y_i$ and the previous average value $G_{i-1}$ as follows:

$$G_i = (1-\lambda) \cdot G_{i-1} + \lambda \cdot Y_i$$

where the characteristic constant of the filter, denoted $\lambda$ lies in the range 0 to 1. Time constant $\tau$ is related to $\lambda$ as follows:

$$\lambda = 1/(1+\tau)$$

Possible values of time constant $\tau$ range from zero to infinity. A value of zero means that no previous samples (i.e., prior to sample $Y_i$) are included in the new average. Values of $\tau$ greater than one yield exponentially damped filtering much like an electrical low pass RC filter.

Figure 3:
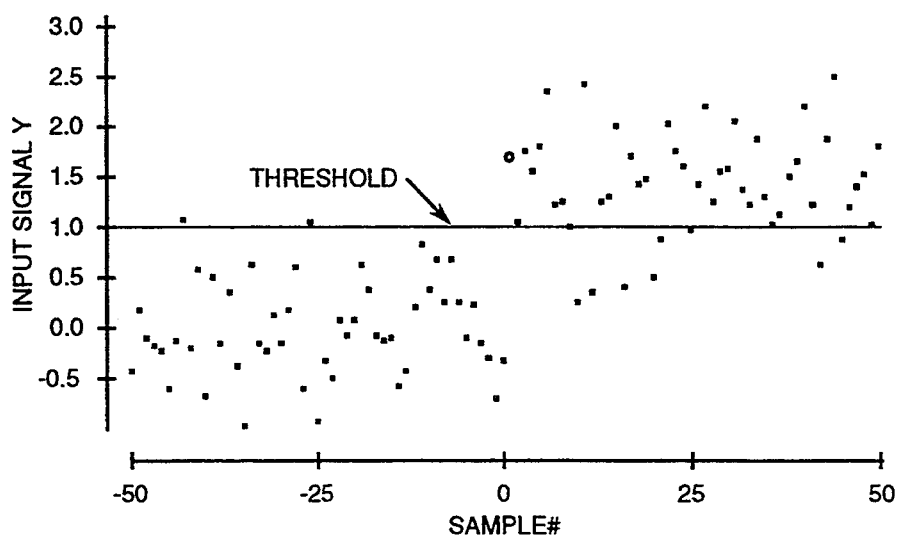
FIG. 3 shows sample values for a data stream corresponding to a changing performance parameter.

Referring to FIG. 3, 100 sample values for input signal Y are shown having Gaussian (normal) distributions with a shift in the base value of the input signal between sample 0 and sample 1. Sample −50 through sample 0 have a mean value of zero and a standard deviation of 0.5. Samples 1 through 50 have a mean value of 1.5 and the same standard deviation of 0.5. Sample 1 is plotted on the Figure by a small circle while all other samples are indicated by a small box. The sudden shift in the mean value of input signal Y at sample 0 may correspond, for example, to a failure of a component or system. A failure should be detected since the mean value has become greater than a threshold having a magnitude of 1.0.

The large noise fluctuations in signal Y in FIG. 3 precludes direct comparison against the threshold to detect the fault. Averaging must be performed over several measurements to reduce the likelihood of false indications of fault (lighting the malfunction indicator light) when no fault is present or failing to consistently indicate a failure condition when it is present.

Figure 4:
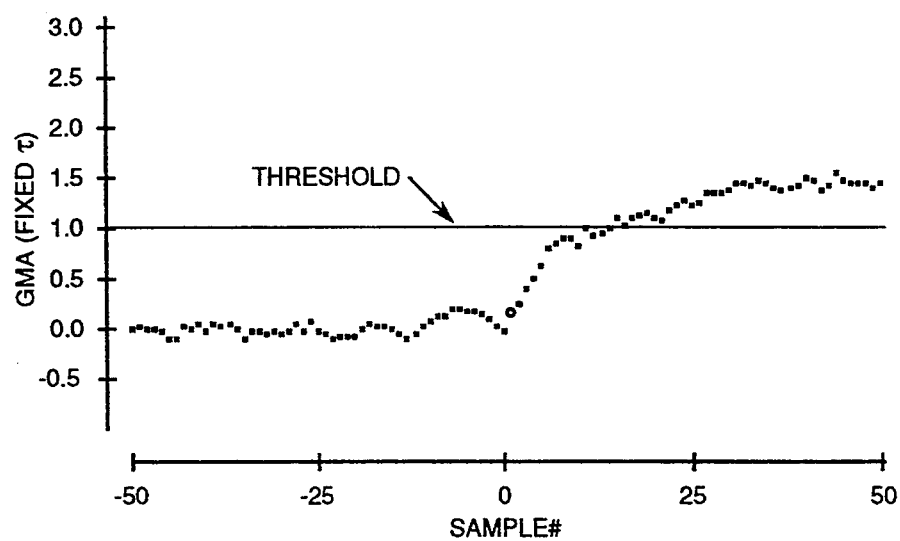
FIG. 4 illustrates the responsiveness of the prior art GMA filter to the change in the data stream.

FIG. 4 illustrates the effect of GMA averaging to perform the required noise reduction in the output signal. In FIG. 4, time constant $\tau$ is fixed at the optimum value to obtain reasonably quick response time and low probability of false indications during normal vehicle use. However, a certain delay exists between the time of sample 1 and the increase of the average value over the threshold to indicate the failure. This delay may be undesirable in certain circumstances. For example, to verify the functionality of the fault detection system, a known bad component may be inserted into the vehicle to create a fault for verifying that the malfunction indicator light will be appropriately activated. On the other hand, after occurrence of a fault, a service technician may replace a component and desire to verify that the fault has been corrected. It is desirable to reduce the delay in determining the fault existence or nonexistence after a component is replaced. Thus, an initialization of the time constant $\tau$ is provided as described below.

A time constant $\tau$ equal to zero provides an average value with no reliance on previous values of the data stream (i.e., no averaging occurs). The greater the value of $\tau$, the greater the fraction of the current GMA value that comes from the previous values of the data stream. In the present invention, a variable value of time constant $\tau$ is adopted. A minimum value $\tau_{min}$ is selected for use at initialization. For succeeding average values $G_i$, $\tau$ is gradually increased with each iteration until it reaches a maximum value $\tau_{max}$.

Figure 5:
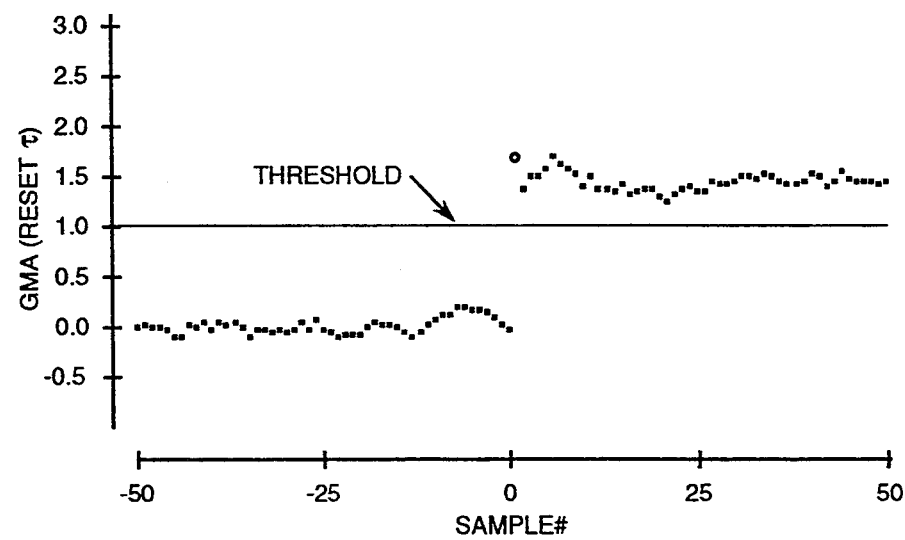
FIG. 5 illustrates the responsiveness of the present invention to the change in the data stream.

FIG. 5 illustrates use of a variable $\tau$ which is reset at initialization. For samples −50 to 0, $\tau$ is at its maximum value just as in FIG. 4. At sample 1, the mean value of the input signal Y changes, but simultaneously $\tau$ is reset to $\tau_{min}$. In this example, $\tau_{min}=0$ so that the GMA output immediately responds to the change in input signal Y. Thus, there is no memory in the current GMA value of the GMA value obtained prior to initialization (hereinafter denoted $G_0$). For succeeding average values $G_i$, $\tau$ is increased by a predetermined step size, such as one, until the value of $\tau_{max}$ is reached. In FIGS. 4 and 5, the value of $\tau_{max}$ is 10 and the step size is 1.

The immediate response time in FIG. 5 is obtained at the expense of a slight temporary increase in noise fluctuations of $G_i$ while $\tau$ is increasing between sample one and sample ten. However, the overall probability of false indications of faults is virtually unchanged since the increase in noise is short lived. In other words, in exchange for an temporary increase in the false alarm rate after each initialization of the averaging routine, changes in the automotive system or component under test can be detected virtually instantly.

Figure 6:
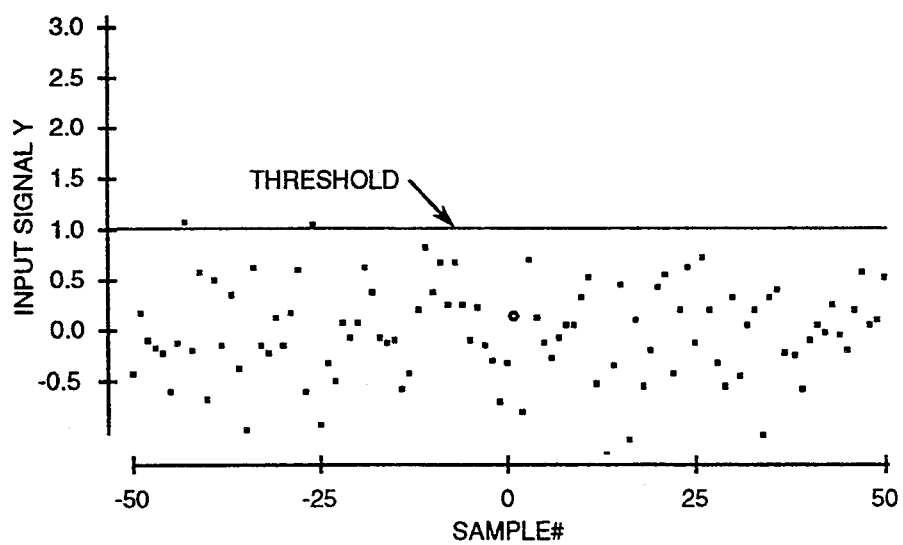
FIG. 6 shows a further sample data stream corresponding to an unchanging performance parameter.
Figure 7:
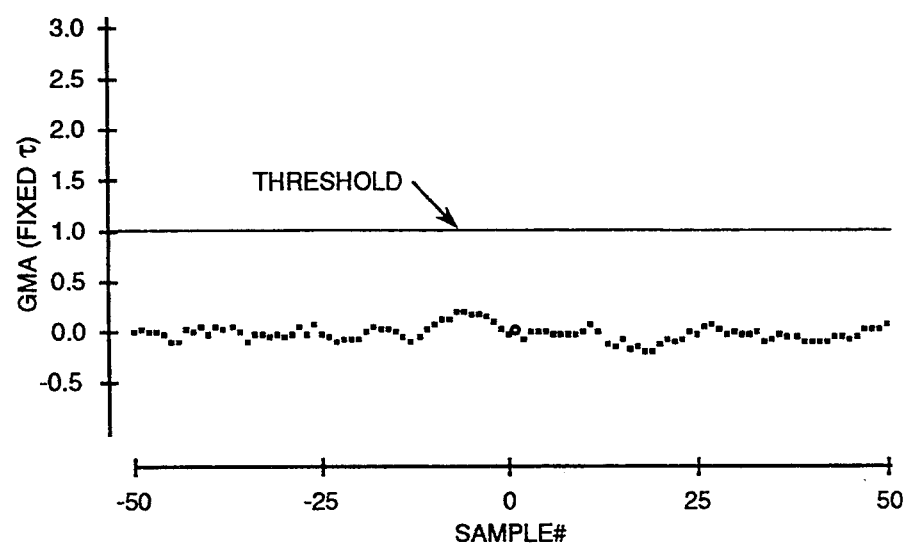
FIG. 7 shows the reduction of random error fluctuations provided by the prior art GMA filter.
Figure 8:
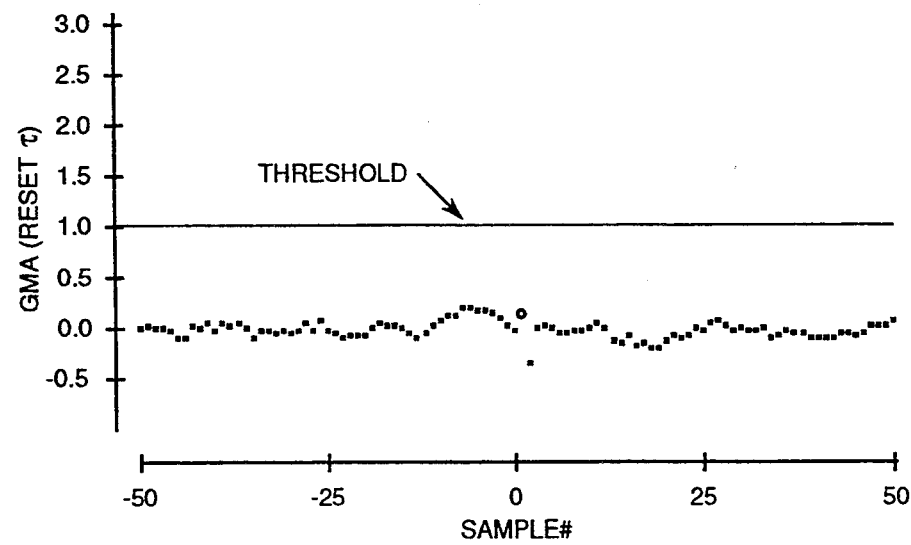
FIG. 8 shows the slight increase in error fluctuations of the present invention during initialization.

FIG. 6 shows a second example of input signal Y wherein sample values from sample −50 to sample 0 are identical to those in FIG. 3 and samples 1 to 50 have a mean value of zero and a standard deviation of 0.5 (i.e., there is no change in the input signal between samples 0 and 1). Compared with the behaviour of a fixed $\tau$ GMA in FIG. 7, the fast-response GMA in FIG. 6 with a variable $\tau$ shows a slight increase in noise beginning at the initialization point (sample 1); but the behaviour settles down very rapidly to yield the same results as the fixed $\tau$ GMA.

For the case where $\tau_{min}=0$ and the step size$=1$, the value of $G_i$ after n measurements of $Y_i$ exactly equals the arithmetic average of $Y_1$ through $Y_n$. This continues to be true until the value of $\tau$ reaches $\tau_{max}$, at which point the output $G_i$ gradually becomes that of the usual GMA value (i.e., with fixed $\tau$). In other words, when $\tau$ becomes fixed, older values of Y have less influence in the GMA value; and the GMA filter gradually starts to forget the oldest data with each iteration.

When $\tau_{min}$ is greater than zero, each average value $G_i$ (including the first value after initialization) includes a contribution from the initial average value $G_0$ before initialization. This initial value $G_0$ may be either the actual $G_i$ value prior to initialization or can be some other value assigned to it during the initialization routine. For example, $G_O$ may be assigned a predetermined constant upon initialization. The inclusion of $G_O$ in the GMA value causes $G_i$ to reach its new correct value more slowly than the case where $\tau_{min}=0$, but still much more rapidly than use of a fixed $\tau$. Thus, use of a time constant $\tau_{min}$ greater than zero provides a compromise approach when it is desired to shorten the response time following initialization but noise fluctuations are so severe that some intermediate degree of averaging must be performed even at the initialization to avoid false indication of faults.

The invention can be further illuminated by the following example. Suppose a data stream quantifying a performance parameter is subject to random fluctuations resulting in a probability of 0.1% of a false indication of a fault. Detecting a fault based on a single value in the data stream could not be tolerated over the huge number of tests during the life of a vehicle. Averaging the data stream prior to comparing to a fault indicating threshold drastically reduces the possibility of false indication of a fault. However, on infrequent occasions when a demonstration of functionality of the fault detection system is required or when a component in the vehicle is replaced, it can be acceptable to provide immediate diagnosis based on a single reading, with a certainty of 99.9% for the first trial.

As described in previously mentioned application Ser. No. 042,257, the GMA filter may be implemented in a "background loop" approximation. This refers to a GMA value that is updated only after several measurements of $Y_i$. Thus, each GMA value $G_i$ may be calculated with a number of new sample values. The gradually increasing value of $\tau$ as employed in the present invention can be easily adapted to background loop implementation by making the step size increase in $\tau$ proportional to the number of new sample values in each average calculation.

What is claimed is:

1. A fault detection system for a vehicle comprising:
   a performance monitor coupled to said vehicle, said performance monitor producing a data stream quantifying a performance parameter of said vehicle, said data stream including random error fluctuations;
   a geometric filter filtering said data stream to produce a plurality of successive average values, said geometric filter characterized by a time constant to produce said average values, wherein said geometric filter is responsive to an initialization signal to obtain a temporary fast response of said geometric filter, wherein said time constant is initialized to a minimum value in response to said initialization signal and is incremented during successive average values to a maximum value;
   a comparator comparing said average values with a predetermined threshold and generating a fault signal when one of said average values exceeds said predetermined threshold, wherein said comparator utilizes the same predetermined threshold both prior to and following said initialization; and
   a diagnostic indicator annunciating a fault in response to said fault signal.

2. The system of claim 1 wherein said time constant is increased by a predetermined step size for successive average values until said maximum value is reached.

3. The system of claim 1 wherein said geometric filter produces an initialization average value equal to a predetermined constant and wherein said first average value to be determined after initialization includes a contribution from said initialization average value.

4. The system of claim 1 wherein said first average value to be determined after initialization includes a contribution from an average value determined prior to initialization.

5. A method of fault detection for a vehicle comprising the steps of:
   monitoring a performance parameter of said vehicle to generate a data stream quantifying said performance parameter;
   initializing a time constant to a minimum value;
   filtering said data stream with a geometric filter to produce an average value in accordance with said time constant;
   comparing said average value with a predetermined threshold;
   generating a fault signal if said average value exceeds said predetermined threshold;
   incrementing said time constant by a predetermined step size and then repeating said filtering, comparing, and generating steps;
   repeating said incrementing, filtering, comparing, and generating steps until said time constant reaches a maximum value; and
   repeating said filtering, comparing, and generating steps using said maximum value for said time constant until said initializing step is repeated.

6. The method of claim 5 further comprising the step of setting an initialization average value to a predetermined constant, wherein the first average value to be determined after said initializing step includes a contribution from said initialization average value.

7. The method of claim 5 wherein the first average value to be determined after said initializing step includes a contribution from an average value determined prior to said initializing step.

* * * * *